United States Patent
Chester, Jr.

(10) Patent No.: US 7,503,630 B2
(45) Date of Patent: Mar. 17, 2009

(54) ASYMMETRIC STATIONARY WHEEL COVER

(76) Inventor: James E. Chester, Jr., 7773 Briarcreek Rd., Tallahassee, FL (US) 32312

( * ) Notice: Subject to any disclaimer, the term of this patent is extended or adjusted under 35 U.S.C. 154(b) by 255 days.

(21) Appl. No.: 11/249,812

(22) Filed: Oct. 13, 2005

(65) Prior Publication Data

US 2007/0085410 A1   Apr. 19, 2007

(51) Int. Cl.
   *B60B 7/20*   (2006.01)
(52) U.S. Cl. ............... 301/37.25; 301/37.109
(58) Field of Classification Search ........... 301/37.101, 301/37.25, 37.109; 40/587
See application file for complete search history.

(56) References Cited

U.S. PATENT DOCUMENTS

| | | | |
|---|---|---|---|
| 1,432,274 A | | 10/1922 | Braucher |
| 2,130,220 A | | 9/1938 | Ball et al. |
| 2,169,237 A | * | 8/1939 | Gasco ................. 40/587 |
| 2,548,070 A | | 4/1951 | Ryan |
| 2,707,131 A | * | 4/1955 | Sundberg ............ 40/587 |
| 2,869,262 A | | 1/1959 | Lucas |
| 3,918,186 A | * | 11/1975 | Gray ................... 40/591 |
| 4,280,293 A | * | 7/1981 | Kovalenko et al. ...... 40/587 |
| 4,929,030 A | * | 5/1990 | Park ................. 301/37.25 |
| 5,016,944 A | * | 5/1991 | Schultz ............. 301/37.25 |
| 5,623,777 A | * | 4/1997 | Hsiao et al. ............ 40/587 |
| 5,659,989 A | | 8/1997 | Hsiao et al. |
| 2002/0125761 A1 | * | 9/2002 | Matushita .......... 301/37.25 |
| 2005/0035651 A1 | * | 2/2005 | Hsiao ............... 301/37.25 |
| 2005/0173968 A1 | * | 8/2005 | Rivers et al. ....... 301/37.25 |
| 2006/0208559 A1 | * | 9/2006 | Morris ............... 301/37.25 |

* cited by examiner

*Primary Examiner*—Russell D Stormer
(74) *Attorney, Agent, or Firm*—Robert C. Brown

(57) ABSTRACT

A wheel cover system comprising a first bearing element mountable to a vehicle's wheel or rim, and a second bearing element rotatable on the first element supportive of a wheel cover assembly that, when mounted to the vehicle, is non-symmetrical in appearance about a first vertical plane extending through the axis of rotation and containing the gravitational direction. The wheel cover itself is also non-symmetrical in shape and/or mass about a second plane extending through the pivot axis of the wheel cover and coincident with the first plane. Balance is provided by weights to the wheel cover on opposite sides of the second plane at differing radial distances from the center of rotation. The weights may differ in mass. In a currently preferred embodiment, the asymmetrical shape of a wheel cover is in the form of an indicium such as a number, alphabetic letter, abstract symbol, or combinations thereof.

8 Claims, 7 Drawing Sheets

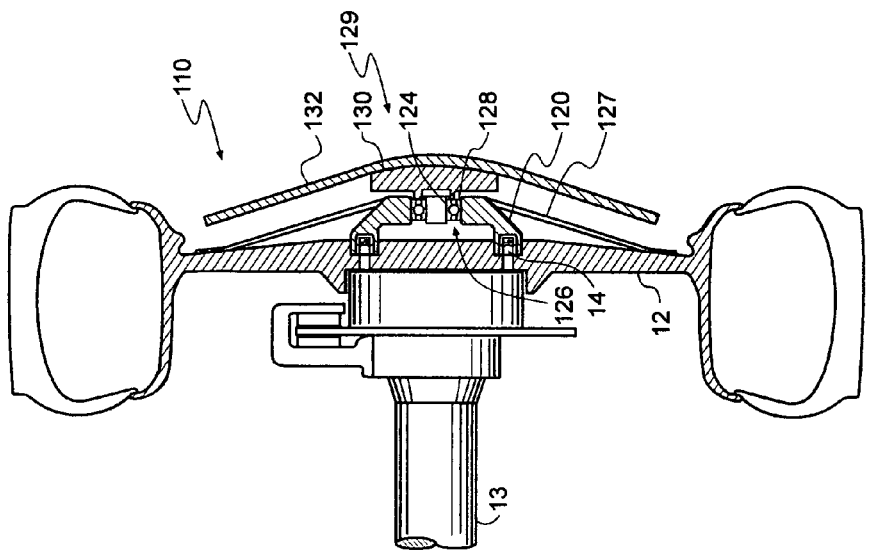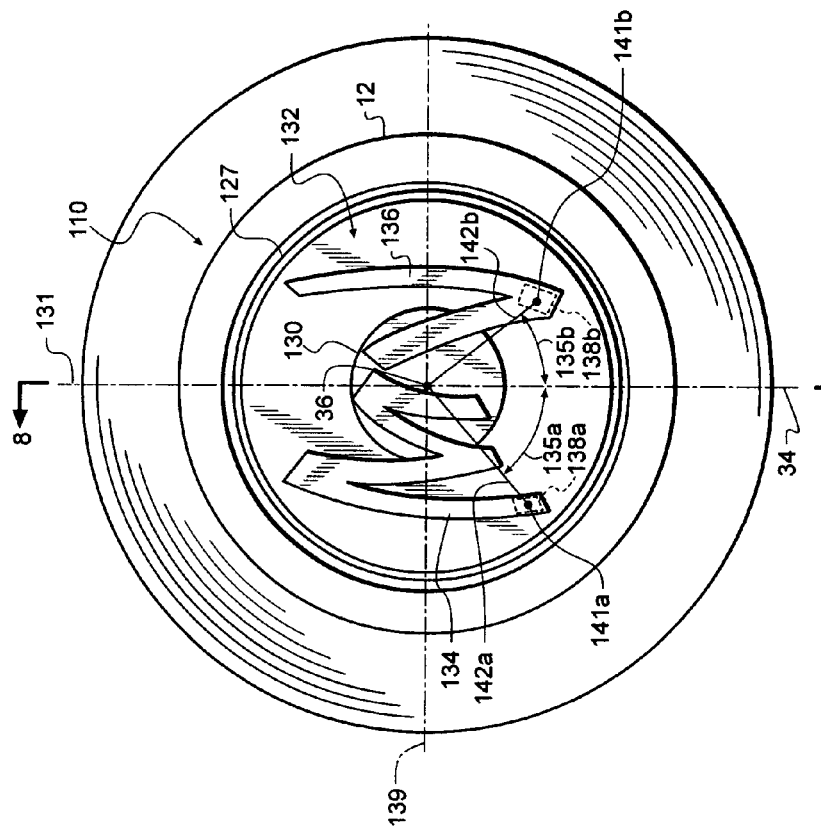

US 7,503,630 B2

ASYMMETRIC STATIONARY WHEEL COVER

TECHNICAL FIELD

The present invention relates to wheel covers for vehicles; more particularly, to wheel covers that are independently rotatable relative to their corresponding vehicle wheels and are counter-weighted to appear stationary while the supporting wheel is rotating; and most particularly, to a wheel cover system (method and apparatus) wherein an assymetric wheel cover rotatable relative to its corresponding vehicle wheel is rendered stationary at a preferred angular orientation during rotation of the wheel by a asymmetric placement of a plurality of counterweights on the wheel cover on opposite sides of the gravitational direction from the wheel axis.

BACKGROUND OF THE INVENTION

Vehicle wheel covers that do not rotate relative to their corresponding vehicle wheels are well known in the art.

In a first prior art wheel cover arrangement, as disclosed for example in U.S. Pat. No. 2,548,070, the wheel cover assembly is attached directly to a non-rotatable axial vehicle element such as a stub axle, and the wheel and tire rim rotate around and behind the cover when the vehicle is in motion, the cover remaining stationary with respect to the wheel and rim. This arrangement is not useful with modern wheel assemblies, and especially rear wheel assemblies, wherein non-rotatable vehicle elements are not available for mounting. In the wheel assemblies of driven wheels, the wheel axle rotates and therefore no stationary axle is present.

In a second prior art wheel cover arrangement, as disclosed for example in U.S. Pat. No. 5,659,989, the wheel cover assembly includes a coaxial bearing system wherein one bearing race is attached to rotatable elements of a vehicle wheel, such as a wheel hub or tire rim, and the other bearing race is attached to the wheel cover. The wheel cover is symmetrical about a vertical plane containing both the wheel axis and the gravitational direction extending therefrom. Symmetrical wheel covers in the prior art are prevented from rotation by addition of one or more weights to lower the center of mass below the center of rotation to cause the wheel cover to assume a predetermined angular position with respect to the vertical plane.

It is known to use a single weight, as disclosed in, for example, U.S. Pat. Nos. 1,432,274; 2,130,220; and 5,659,989. It is further known to use two equal weights disposed symmetrically at equal radial distances from the wheel axis on either side of the vertical plane, as disclosed in, for example, U.S. Pat. No. 2,869,262.

A prior art wheel cover is typically a simple disc, either flat as disclosed in, for example, either of U.S. Pat. Nos. 1,432,274 and 2,869,262, or domed as disclosed in, for example, U.S. Pat. No. 2,130,220. A prior art symmetrical wheel cover may not cover the entire wheel surface and may comprise a symmetrical filigree pattern as disclosed, for example, in U.S. Pat. No. 5,659,989.

A serious shortcoming of all prior art stationary wheel cover disclosures is that they are suited only to either non-ornamented designs such as plain discs or symmetrical designs.

What is needed in the art is a wheel cover system wherein a wheel cover design may be of any form, may be symmetrical or non-symmetrical, may be filigreed to cover part or all of a wheel, and may be positioned at any desired angular orientation consistent with the laws of gravity.

It is a principal object of the present invention to position any stationary wheel cover at any desired angular position.

It is a further object of the invention to facilitate the stationary mounting and angular positioning of non-symmetrical wheel covers which may be filigreed and may be in the form of indicia.

SUMMARY OF THE INVENTION

Briefly described, a wheel cover system in accordance with the invention comprises an axial bearing mount wherein a first bearing element is mountable to a rotatable element of a vehicle, such as a wheel hub or a tire rim, and a second bearing element rotatable on the first bearing element is supportive of a wheel cover assembly that, when mounted to the vehicle, is non-symmetrical about a first vertical plane extending through the axis of rotation and containing the gravitational direction. The term "non-symmetrical" as used herein means unequal in at least one of shape, mass, and combinations thereof. As formed, the wheel cover is also non-symmetrical about a second plane extending through the axis of the second bearing element. To cause the wheel cover to assume a preferred stationary equilibrium orientation with respect to its supportive wheel, the mass of the wheel cover must be balanced such that the second plane is coincident with the first plane. Such balance is provided by the asymmetric addition of one or more weights to the wheel cover, preferably on the obverse side thereof. The one or more weights do not fall on the second plane but rather to one side and/or the other thereof. Where a plurality of weights are selected, weights may fall on opposite sides of the second plane and may be placed at differing radial distances from the center of rotation. Further, the weights may differ in mass. In a currently preferred embodiment, the asymmetrical shape of a wheel cover is in the form of an indicium such as a number, alphabetic letter, symbol, or combinations thereof.

BRIEF DESCRIPTION OF THE DRAWINGS

The present invention will now be described, by way of example, with reference to the accompanying drawings, in which:

FIGS. 7 and 8 are an elevational view and an elevational cross-sectional view, respectively, of a stationary wheel cover assembly in accordance with the invention, showing alphabetic indicia;

DESCRIPTION OF THE PREFERRED EMBODIMENTS

The distinctions and benefits of the present invention may be better appreciated by first considering the elements and limitations of three prior art examples of stationary wheel cover systems employing wheel covers mounted on bearing assemblies.

Figure 2:
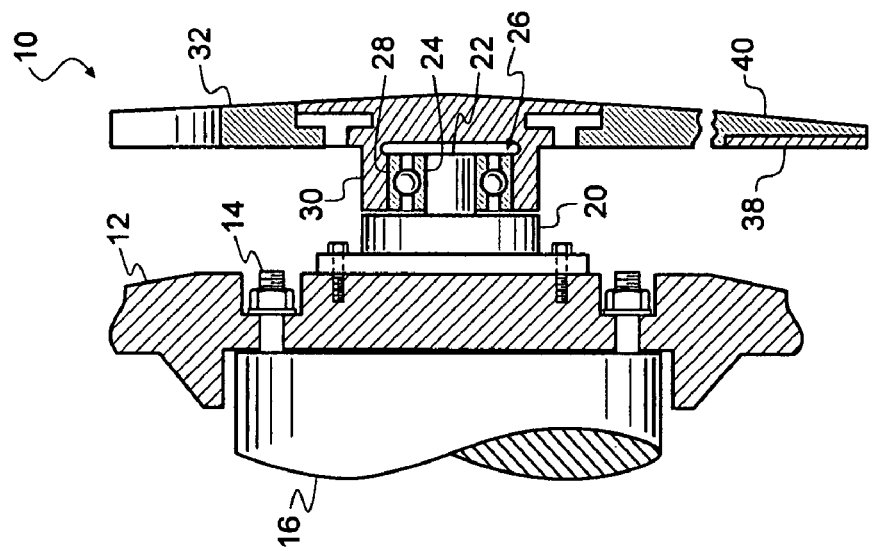
FIGS. 1 and 2 are an elevational view and an elevational cross-sectional view, respectively, of a first prior art stationary wheel cover assembly, substantially as disclosed in U.S. Pat. No. 5,659,989.
Figure 1:
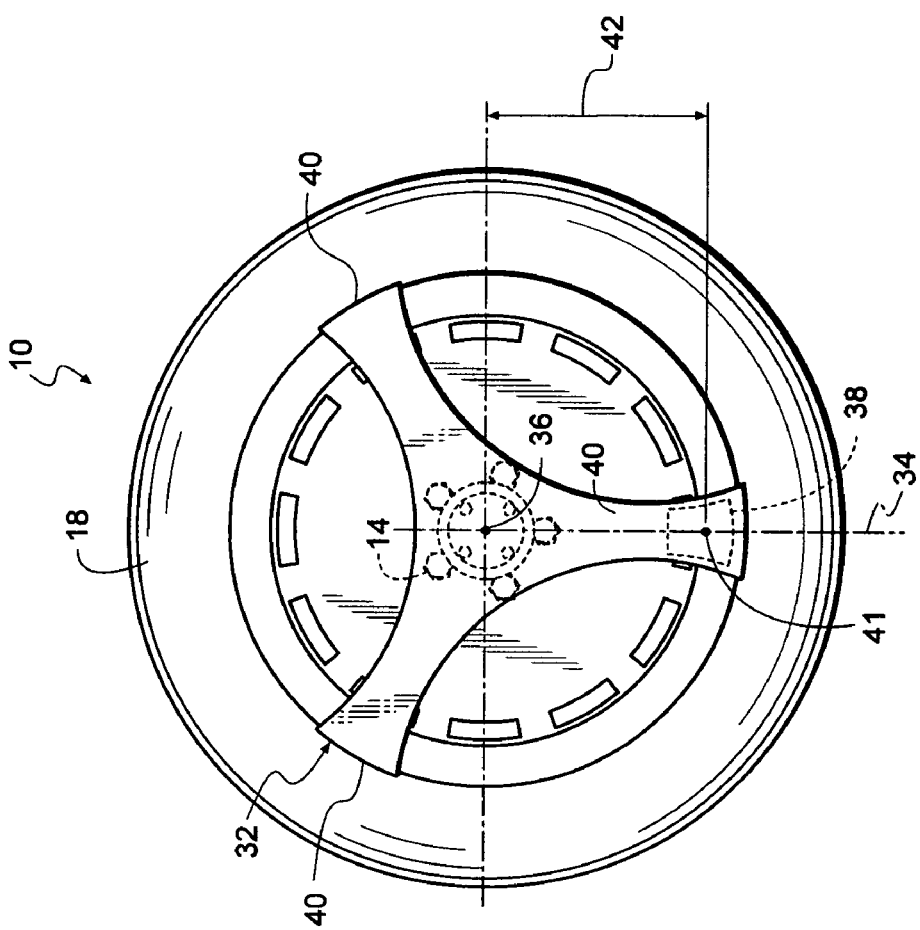

Referring to FIGS. 1 and 2, a first prior art stationary wheel cover system 10, substantially as disclosed in U.S. Pat. No. 5,659,989, is provided for mounting to a vehicle wheel 12, also known as a tire rim, which is itself mounted via studs and nuts 14 to a wheel hub 16. Wheel 12 is supportive of a vehicle inflatable tire 18.

System 10 comprises a substantially cylindrical base hub 20 having a centrally disposed protrusion 22 formed therethrough to operatively receive and support thereon an inner bearing race 24 of a ball bearing assembly 26. Outer bearing race 28 receives and supports an outer hub portion 30 of a wheel cover 32.

Wheel cover 32 is filigreed, by which is meant that portions of an otherwise continuous disc-shaped cover are not present, giving rise to a shape in silhouette. The filigreed shape of wheel cover 32 is equilaterally triangular and is symmetrical about a vertical plane 34 coincident with the direction of gravity and containing the axis of rotation 36 of wheel 12 and hub 16. A single weight 38 is mounted to the rear of one of three arms 40 of wheel cover 32, the center of mass 41 of weight 38 being at a radial distance 42 from axis 36. Center of mass 41 is contained in plane 34. Thus, by means of bearing assembly 26 and weight 38, wheel cover 32 does not rotate (remains stationary by gravitational force and maintains a fixed and predetermined angular orientation to gravity) when wheel 12 and inner hub 20 are rotated, and the silhouette of wheel cover 32 remains symmetrically disposed with respect to plane 34.

The wheel cover system as shown in FIGS. 1 and 2 and disclosed in U.S. Pat. No. 5,659,989, having a single weight disposed in a single arm 40 of wheel cover 32, is incapable of angularly orienting symmetrical wheel cover 32 in any stationary attitude other than that shown in FIG. 1. Further, this wheel cover system cannot angularly orient an asymmetrical wheel cover at a predetermined stationary attitude wherein the center of mass of a single weight does not fall on vertical plane 34.

Figure 4:
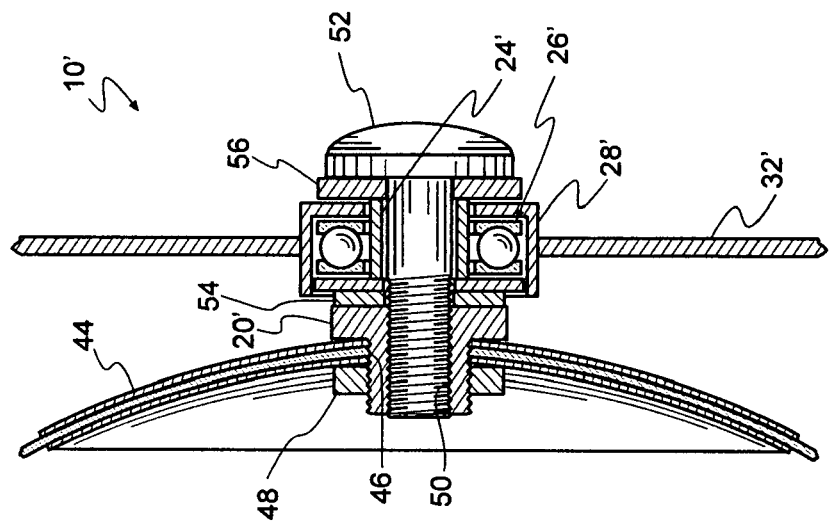
FIGS. 3 and 4 are an elevational view and an elevational cross-sectional view, respectively, of a second prior art stationary wheel cover assembly, substantially as disclosed in U.S. Pat. No. 2,869,262.
Figure 3:
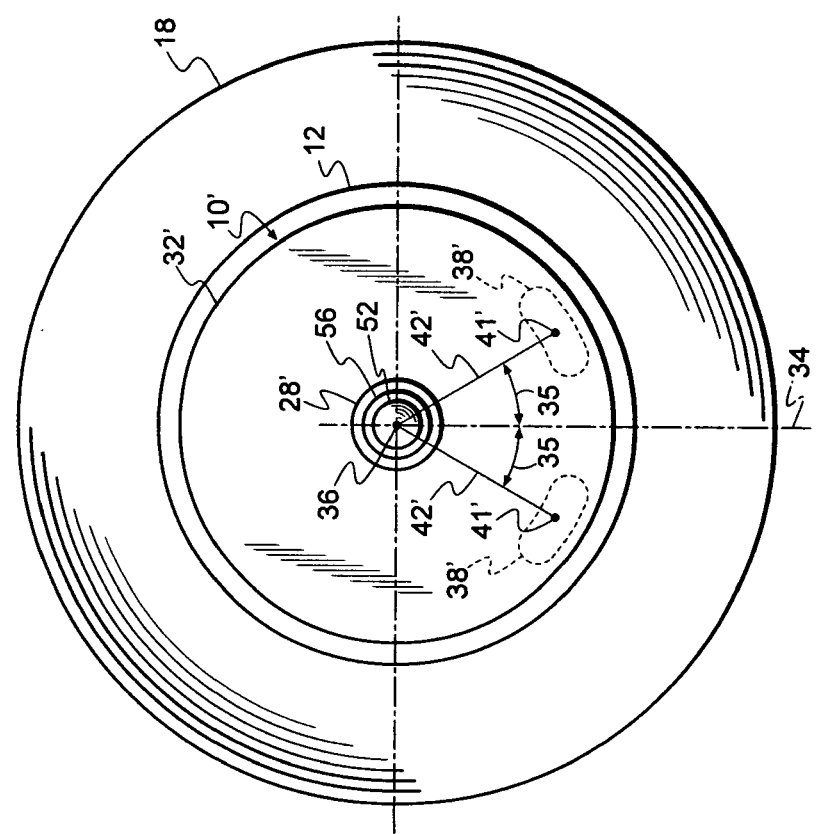

Referring to FIGS. 3 and 4, a second prior art stationary wheel cover system 10' is provided for mounting to a hubcap 44 of a vehicle wheel 12. Wheel 12 is supportive of a vehicle inflatable tire 18.

System 10' comprises a substantially cylindrical base hub 20' received in a central threaded opening 46 in hubcap 44 and retained therein by a nut 48. Base hub 20' includes a threaded axial bore 50 for receiving a binder screw 52 for attaching system 10' to hubcap 44. A ball bearing assembly 26' includes an inner bearing race 24' which is retained between first and second washers 54,56 and captured by screw 52. Outer bearing race 28' receives and supports a wheel cover 32'.

Wheel cover 32' is non-filigreed, by which is meant that the disc-shaped cover is continuous. First and second identical weights 38' are mounted to the rear of cover 32', the centers of mass 41' of weights 38' being at equal radial distance 42' from axis 36. Centers of mass 41' are disposed at equal central angles 35 from gravitational plane 34 and are therefore symmetrical about plane 34. Thus, by means of bearing assembly 26' and weights 38', wheel cover 32' does not rotate when wheel 12 is rotated.

The wheel cover system as shown in FIGS. 3 and 4 and disclosed in U.S. Pat. No. 2,869,262, having a uniform disc-shaped wheel cover 32' and having first and second identical weights 38' disposed symmetrically at identical radial distances 42' is incapable of angularly orienting symmetrical wheel cover 32' in any stationary attitude other than that shown in FIG. 3 wherein weights 38' are disposed at identical and opposite central angles 35 from vertical plane 34. Further, this wheel cover system cannot angularly orient an asymmetrical wheel cover at a predetermined stationary attitude wherein the centers of mass of first and second weights are disposed asymmetrically at differing central angles from vertical plane 34.

Figure 6:
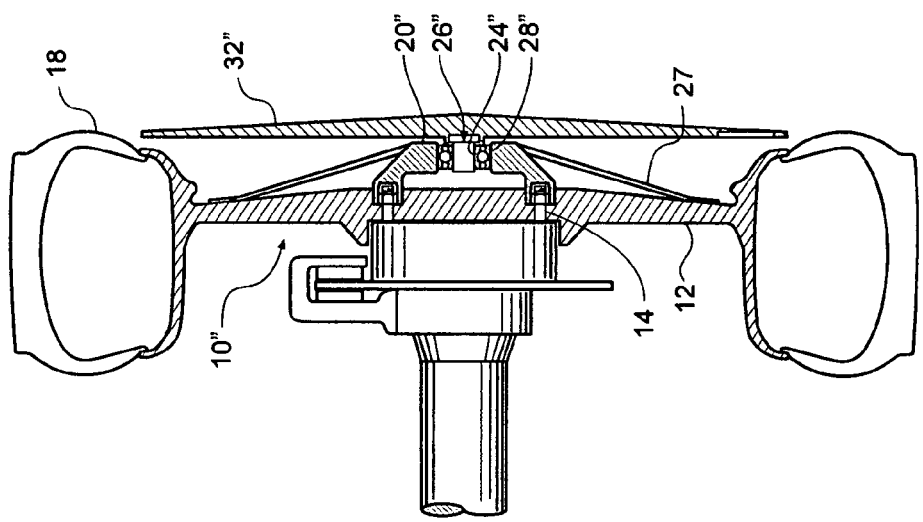
FIGS. 5 and 6 are an elevational view and an elevational cross-sectional view, respectively, of a third prior art stationary wheel cover assembly, substantially as disclosed in U.S. Pat. No. 5,659,989.
Figure 5:
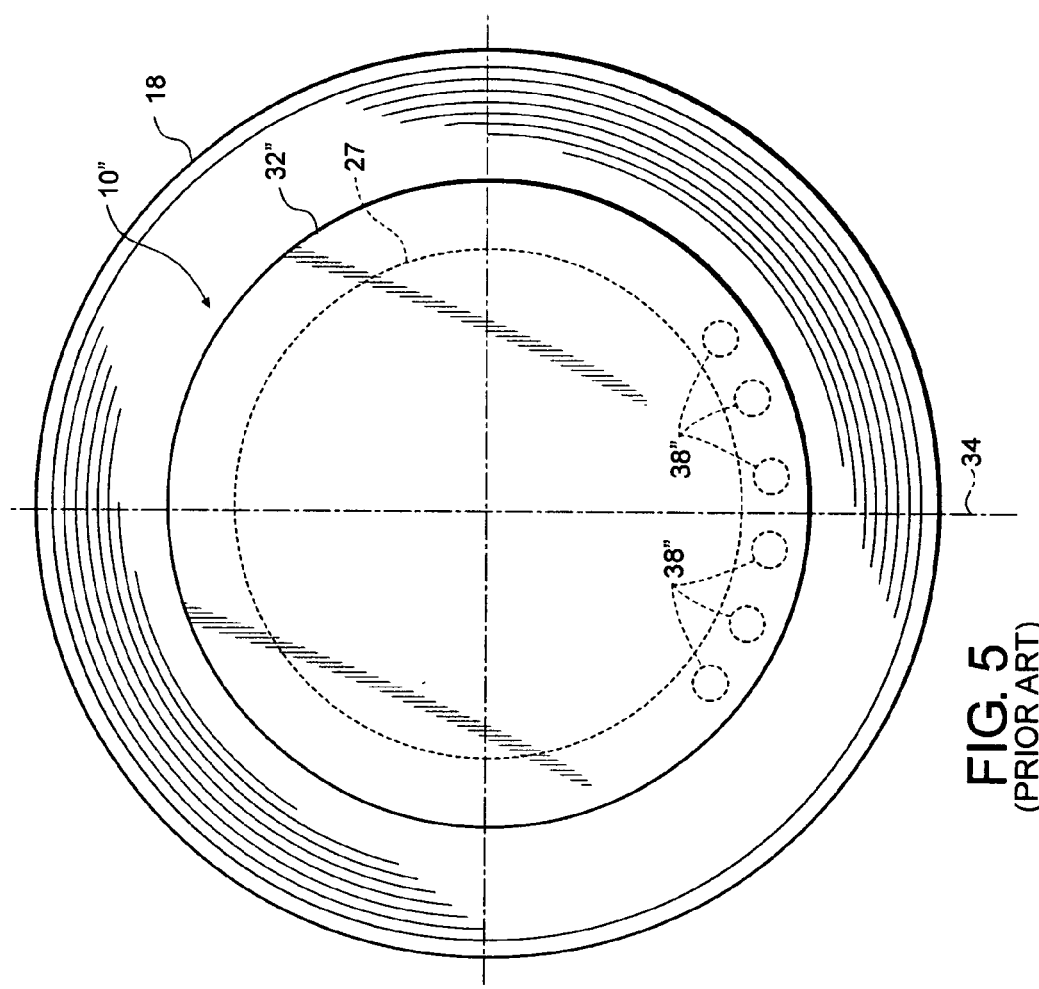

Referring to FIGS. 5 and 6, a third prior art stationary wheel cover system 10" is provided for mounting to a vehicle wheel 12. Wheel 12 is supportive of a vehicle inflatable tire 18.

System 10" comprises a base hub 20" attached to wheel 12 via wheel studs 14. A ball bearing assembly 26" attached to base hub 20" includes an outer bearing race 28". Inner bearing race 24" receives and supports a wheel cover 32". A shield element 27 is attached to base hub 20" and extends radially outward to cover a portion of wheel 12.

Wheel cover 32" is non-filigreed. A plurality of identical weights 38" are mounted into wells formed in cover 32'. As in prior art system 10' described above, the centers of mass of weights 38" are positioned symmetrically about plane 34 at equal radial distances from axis 36 and are disposed at equal central angles from gravitational plane 34. Thus, by means of bearing assembly 26" and weights 38", wheel cover 32" does not rotate when wheel 12 is rotated.

The prior art wheel cover system as shown in FIGS. 5 and 6 and disclosed in U.S. Pat. No. 5,659,989, having a uniform disc-shaped wheel cover 32" and having a plurality of identical weights 38" disposed symmetrically at identical radial distances is incapable of angularly orienting symmetrical wheel cover 32" in any stationary attitude other than that shown in FIG. 5. Further, this wheel cover system cannot angularly orient an asymmetrical wheel cover at a predetermined stationary attitude wherein the centers of mass of a plurality of weights are disposed asymmetrically at differing central angles from vertical plane 34.

Referring to FIGS. 7 and 8, an improved wheel cover system 110 in accordance with the invention is shown for providing stationary, non-rotating orientation of an asymmetrical wheel cover in a preferred angular orientation with respect to gravity when system 110 is mounted on a vehicle 13.

System 110 comprises a base hub 120 attached to wheel 12 via wheel studs 14. A ball bearing assembly 126 attached to base hub 120 includes an outer bearing race 128. Inner bearing race 124 receives and supports a first wheel cover assembly 129 comprising an outer hub 130 and a first wheel cover 132. An optional shield element 127 is attached to base hub 120 and extends radially outward to cover a portion of wheel 12.

Wheel cover assembly 129 is asymmetrical in shape and mass about an assembly plane 131 which, in the preferred stationary angular orientation, coincides with vertical plane 34. Wheel cover 132 comprises first and second indicial elements 134,136 in the form of exemplary first lower case alphabetic letters "m" and "v" attached to outer hub 130. Hub 130 and elements 134,136 are preferably formed of metal, for example, stainless steel, and may be formed, for example, by cutting from sheet stock or by molding and/or machining in known fashion.

To cause plane 131 to coincide with plane 34, at least a first weight 138a and preferably a second weight 138b having first and second centers of mass 141a,141b are attached asymmetrically to indicial elements 134,136, respectively, at locations thereupon corresponding to first and second radial distances 142a,142b and first and second central angles 135a, 135b, respectively. The selected locations for weights 138a, 138b are below a horizontal plane 139 containing wheel axis 36 such that the center of mass of the overall wheel cover assembly 129 is below axis 36. As distinct from prior art systems 10' and 10", the first and second radial distances 142a,142b may be unequal, and the first and second central angles 135a,135b may be unequal as required to cause plane 131 to coincide with plane 34. Weights 138a,138b preferably are formed of a material having a higher specific gravity than the material of indicial elements 134,136, for example, lead.

It should be noted that in wheel covers that are very highly asymmetric, only one weight 138a may be required to balance the mass of the wheel cover on the opposite side of plane 131. However, even in such cases it may be desirable to use first and second weights as described above, having a net balance weight, to apply more gravitational force onto bearing unit 126 and to increase the overall mass and rotational inertia of the wheel cover assembly to further stabilize the wheel cover assembly in a stationary mode during rotation of wheel 12.

The primary purpose of a wheel cover assembly in accordance with the invention is decorative. Wheel cover 132 may be personalized in the form of, for example, the initials of an owner's name or a player's jersey number. Further, wheel cover 132 and shield 127 may be finished in contrasting colors, for example, gold and black, respectively, to emphasize the appearance of the wheel cover. In a typical installation on a vehicle, all four wheels are provided with wheel cover systems in accordance with the invention; the four systems may be identical or may differ.

Figure 9:
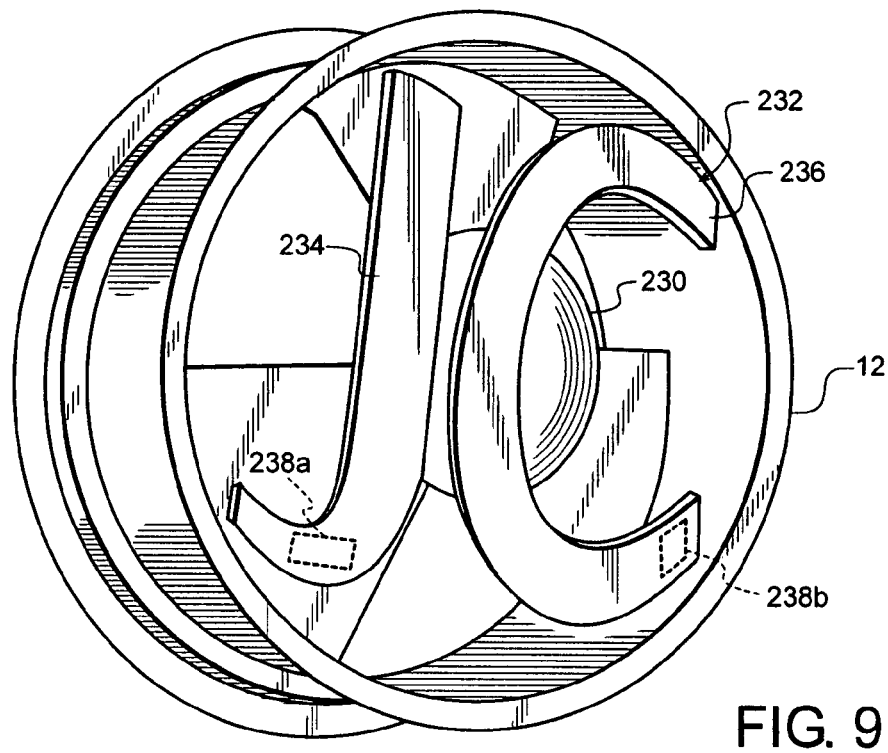
FIG. 9 is an isometric view of a stationary wheel cover assembly in accordance with the invention, showing second alphabetic indicia.

Referring to FIG. 9, a second wheel cover 232 in accordance with the invention comprises first and second indicial elements 234,236 in the form of exemplary upper case second alphabetic letters "J" and "C" attached asymmetrically to outer hub 230. Weights 238a,238b are attached to indicial elements 234,236 to cause the wheel cover to assume a predetermined, desired, stationary angular orientation during rotation of wheel 12.

Figure 10:
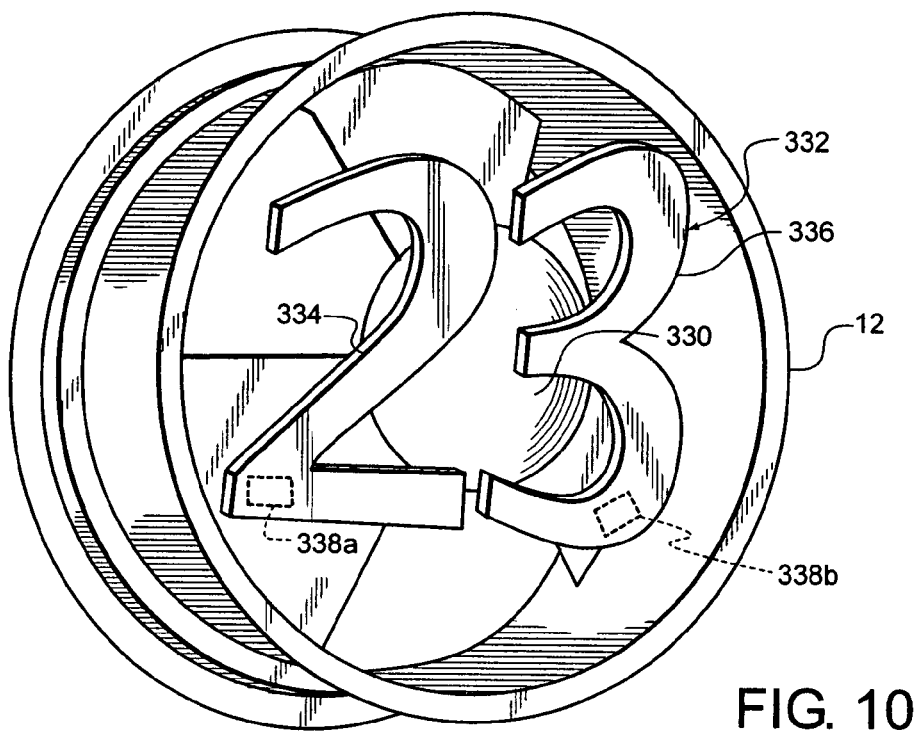
FIG. 10 is an isometric view of a stationary wheel cover assembly in accordance with the invention, showing numeric indicia.

Referring to FIG. 10, a third wheel cover 332 in accordance with the invention comprises first and second indicial elements 334,336 in the form of exemplary arabic numerals "2" and "3" attached to outer hub 330. Weights 338a,338b are attached asymmetrically to indicial elements 334,336 to cause the wheel cover to assume a predetermined, desired, stationary angular orientation during rotation of wheel 12.

Figure 11:
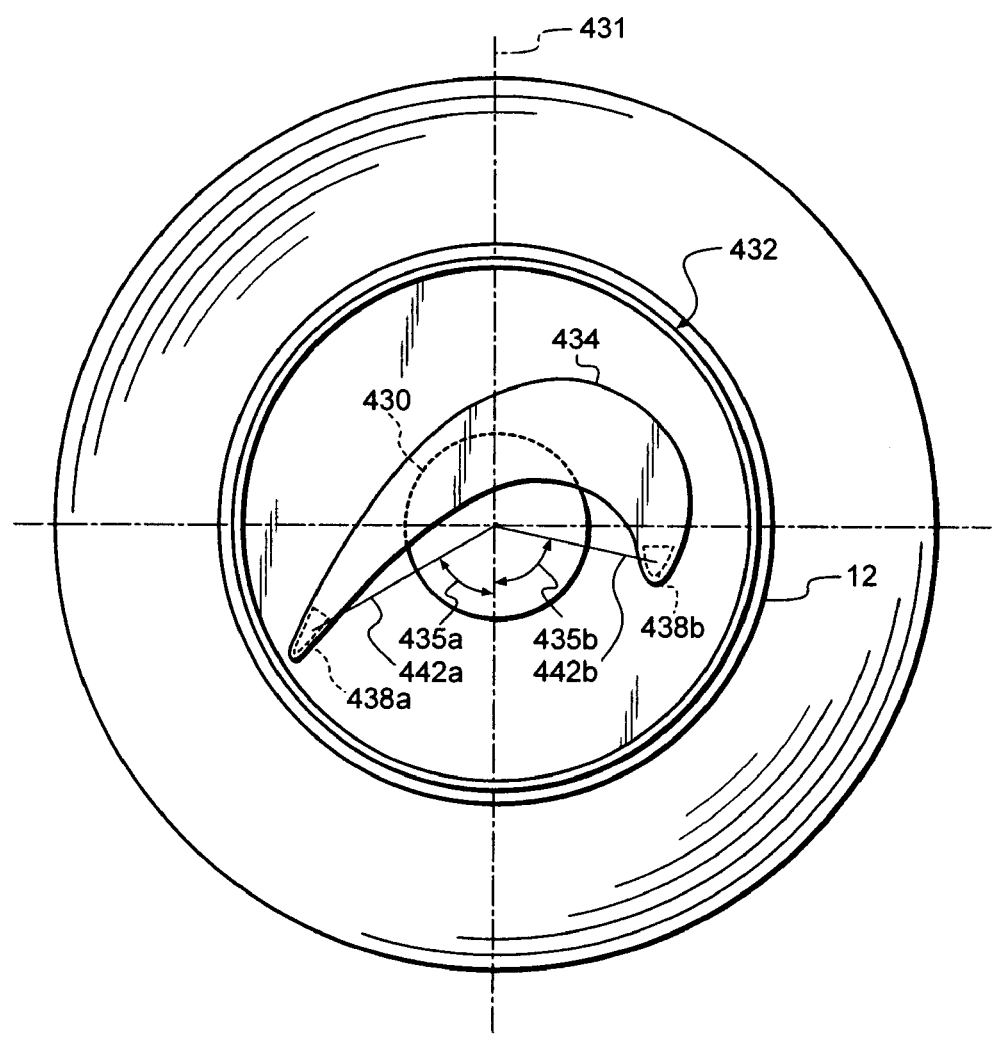
FIG. 11 is an elevational view of a stationary wheel cover assembly in accordance with the invention, showing an abstract symbolic indicium.

Referring to FIG. 11, a fourth wheel cover 432 in accordance with the invention comprises a single indicial element 434 in the form of an abstract shape attached to outer hub 430. Weights 438a,438b are attached asymmetrically to indicial element 434 at first and second radial distances 442a,442b and first and second central angles 435a,435b with respect to wheel cover plane 431 to cause the wheel cover to assume a predetermined, desired, stationary angular orientation during rotation of wheel 12.

Figure 12:
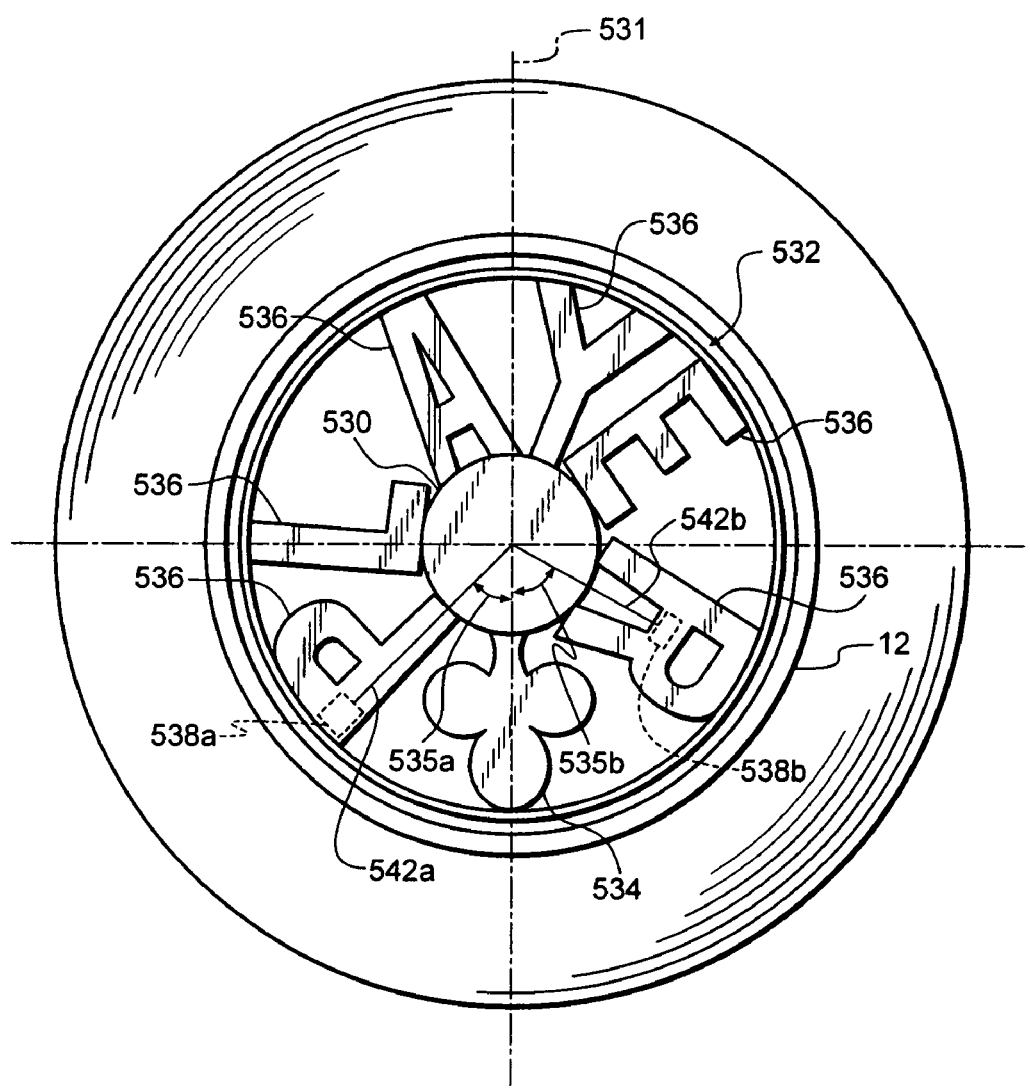
FIG. 12 is an elevational view of a stationary wheel cover assembly in accordance with the invention, showing combined alphabetic and symbolic indicia.

Referring to FIG. 12, a fifth wheel cover 532 in accordance with the invention comprises a combination of an indicial element 534 in the form of an abstract shape and a plurality of alphabetic letters 536 attached to outer hub 530. Weights 538a,538b are attached asymmetrically to indicial elements 536 at first and second radial distances 542a,542b and first and second central angles 535a,535b with respect to wheel cover plane 531 to cause the wheel cover to assume a predetermined, desired, stationary angular orientation during rotation of wheel 12.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A method for positioning a rotatable wheel cover at a preferred stationary angular orientation with respect to a vertical first plane containing an axis of the wheel and the gravitational direction, comprising the steps of:
   a) applying a first weight to said wheel cover at a first radius from said axis and at a first central angle from said axis and said gravitational direction; and
   b) applying a second weight to said wheel cover at a second radius from said axis and at a second central angle from said axis and said gravitational direction,
   wherein the length of the first radius is not equal to the length of the second radius, said first and second weights are disposed on opposite sides of said vertical first plane, and
   wherein first material comprising said wheel cover has a first specific gravity and wherein material comprising said first and second weights has a second specific gravity greater than said first specific gravity.

2. A method in accordance with claim 1 wherein said stationary wheel cover is asymmetric in at least one of shape and mass about a second plane through said wheel cover, and wherein said second plane is coincident with said first plane when said wheel cover is stationary.

3. A method in accordance with claim 1 further comprising a third plane orthogonal to said first plane and containing said wheel axis, wherein said first and second weights are disposed below said third plane.

4. A method in accordance with claim 3 wherein wherein said stationary wheel cover is asymmetric about said third plane.

5. A wheel cover system for covering a vehicle wheel to provide the appearance of non-rotation of a wheel cover when the wheel is rotated about a wheel axis, wherein a first plane contains the wheel axis and the gravitational direction, comprising:
   a) an inner hub for attachment to a rotatable element of said vehicle;
   b) an outer hub;
   c) a bearing system disposed between said inner hub and said outer hub for providing free rotation therebetween;
   d) a wheel cover disposed on said outer hub, said outer hub and said wheel cover defining a wheel cover assembly; and
   e) a first weight disposed on said wheel cover at a first radial distance from said axis and a second weight disposed on said wheel cover at a second radial distance from said axis not equal to said first radial distance to cause said wheel cover assembly to remain stationary when said wheel is rotated about a wheel axis,
   wherein said wheel cover is asymmetric in at least one of shape and mass about a second plane through said wheel cover assembly, and wherein said first radius forms a central angle with said second plane and said axis, and wherein said weight is positioned on said wheel cover such that said second plane is coincident with said first plane when said wheel cover is stationary and said weight is outside of said first and second planes, and wherein first material comprising said wheel cover has a first specific gravity and wherein material comprising said first and second weights has a second specific gravity greater than said first specific gravity.

6. A wheel cover system in accordance with claim 5 wherein said wheel cover is filigreed.

7. A wheel cover system in accordance with claim 5 wherein said wheel cover includes an indicium.

8. A wheel cover system in accordance with claim 7 wherein said indicium is selected from the group consisting of alphabetic letter, numeral, abstract shape, and combinations thereof.

* * * * *